(12) United States Patent
Seiji

(10) Patent No.: US 8,679,716 B2
(45) Date of Patent: Mar. 25, 2014

(54) TWO-COMPONENT DEVELOPER

(71) Applicant: Kyocera Document Solutions, Inc., Osaka (JP)

(72) Inventor: Kikushima Seiji, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/694,160

(22) Filed: Oct. 31, 2012

(65) Prior Publication Data

US 2013/0108951 A1   May 2, 2013

(30) Foreign Application Priority Data

Nov. 2, 2011   (JP) .................. 2011-241113

(51) Int. Cl.
*G03G 9/08* (2006.01)

(52) U.S. Cl.
USPC ...................................... 430/108.7

(58) Field of Classification Search
USPC ........................................ 430/108.7, 108.6
See application file for complete search history.

(56) References Cited

U.S. PATENT DOCUMENTS 7,803,509 B2 *   9/2010   Moriyama et al. ......... 430/109.4

FOREIGN PATENT DOCUMENTS

| JP | 2000-221726 A1 | * | 8/2000 |
| JP | 2001-154402 A | | 6/2001 |
| JP | 2001-265052 A | | 9/2001 |
| JP | 2002-365834 A | | 12/2002 |
| JP | 2005-91986 A | | 4/2005 |

OTHER PUBLICATIONS

USPTO English-language translation of JP 2000-221726 (pub. Aug. 2000).*
Clariant webpage at http://www.clariant.com/C12579EC0046869F/vwWebPagesByID/D4DEED33C378D0E6C12579EC002FBB8B, copyright 2013.*
Notice of Reasons for Rejection issued to JP Application No. 2011-241113, mailed Jun. 25, 2013.
JP2001-154402 Machine Translation, (JP2001-154402, pub. Jun. 2001).
JP2001-265052 Machine Translation, (JP2001-265052, pub. Sep. 2001).
JP2005-91986 Machine Translation, (JP2005-91986, pub. Apr. 2005).

* cited by examiner

*Primary Examiner* — Janis L Dote

(57) ABSTRACT

A two-component developer includes a positively chargeable toner and a carrier. The positively chargeable toner is composed of an external additive and toner base particles containing at least a binder resin, a colorant, a charge control agent, and a release agent. The external additive contains at least silica. The silica has an average primary particle diameter (X) of 12 nm or more and 30 nm or less, an average agglomeration ratio (Y2/Y1) between an average agglomeration number (Y1) on a surface of the toner base particles and an average agglomeration number (Y2) on a surface of the carrier is 0.97 or more, and the average agglomeration number (Y2) on a surface of the carrier is 5 or more and 15 or less, is used.

2 Claims, No Drawings

TWO-COMPONENT DEVELOPER

REFERENCE TO RELATED APPLICATIONS

This application is based upon and claims the benefit of priority from the corresponding Japanese Patent Application No. 2011-241113, filed in the Japan Patent Office on Nov. 2, 2011, the entire contents of which are incorporated herein by reference.

FIELD

The present disclosure relates to a two-component developer composed of a positively chargeable toner and a carrier.

BACKGROUND

In electrophotography, generally, an image with high quality is obtained by charging a surface of a photoconductor drum by corona discharge etc., forming an electrostatic latent image by exposure using laser etc., developing the electrostatic latent image with a toner to form a toner image, and transferring the toner image to a recording medium. The toner used for forming toner images is typically one produced by mixing a binder resin such as thermoplastic resin with a colorant, a charge control agent, a release agent, and the like, then the mixture is further mixed and kneaded, pulverized, and classified to form toner base particles with an average particle diameter of 5 μm or more and 10 μm or less. In order to provide flowability to the toner, to perform charge control of the toner, and to improve easiness of cleaning of the toner from the surface of the photoconductor drum, inorganic fine particles such as those of silica or titanium oxide are externally added to the toner.

However, the inorganic fine particles typically tend to be negatively charged, and silica exhibits a strong negative chargeability in particular. Consequently, when the inorganic fine particles are applied to a positively chargeable toner, inorganic fine particles on which surface a positively chargeable polar group has been introduced are used. When silica fine particles are actually used as an external additive, dry silica fine particles in which a positively chargeable polar group such as amino group has been introduced into the silica using an aminosilane coupling agent and a hydrophobizing treatment has been further performed using a hydrophobizing agent, wet silica fine particles in which a hydrophobizing treatment has been performed using a silicone oil, or the like have been used.

Such silica, into which a positively chargeable polar group has been introduced and subjected to the hydrophobizing treatment, is often externally added to toner base particles in order to impart flowability or a proper charging property to the toner; however, in a case of using silica with a lower particle diameter, the silica may be embedded into toner base particles depending on the size. When such an external additive is embedded into toner base particles, flowability of the toner may degrade and charged amount of the toner may be out of a desired range, thus it may be difficult to obtain images with desired image densities.

For the countermeasure to these problems, fumed silica of which primary particles are bonded and agglomerated by a covalent bond and which is produced by a flame hydrolysis method may be used in order to provide flowability to the toner and to suppress embedment of the silica into the surface of the toner. In regards to the toner externally added with silica composed of agglomerated primary particles, a toner is proposed in which flowability may be imparted to the toner and embedment of an external additive into the toner may be suppressed by use of silica having such a configuration that fine particles of 6 or more and 500 or less are covalently bonded like a chain or branch.

However, in the two-component developer where a positively chargeable toner (hereinafter, also merely referred to as "toner") and a carrier are mixed, when the toner and the carrier are stirred, cracks may occur in the silica agglomerates due to a strong stress on the toner. Here, in a case in which a positively chargeable polar group has been introduced to the silica or the silica has been subjected to a surface treatment such as hydrophobization, and then cracks have occurred in the silica agglomerates, a positively chargeable toner of inferior charge may occur by an effect of exposure of non-surface-treated silica surface. When an inferior charge occurs in the toner, image defects such as fog may occur in the resulting images.

The present disclosure has been made in view of the problems described above; and it is an object of the present disclosure to provide a two-component developer in which lowering of image densities of resulting images below a desired value can be suppressed and occurrence of image defects such as fog can be suppressed even in cases of printing for a long period.

The two-component developer of the present disclosure includes a positively chargeable toner and a carrier. The positively chargeable toner is composed of an external additive and toner base particles containing at least a binder resin, a colorant, a charge control agent and a release agent. The external additive contains at least silica. The silica has an average primary particle diameter (X) of 12 nm or more and 30 nm or less. An average agglomeration ratio (Y2/Y1) of the silica between an average agglomeration number (Y1) on a surface of the toner base particles and an average agglomeration number (Y2) on a surface of the carrier is 0.97 or more. The average agglomeration number (Y2) on a surface of the carrier of 5 or more and 15 or less.

DETAILED DESCRIPTION OF EMBODIMENTS

The present disclosure is explained in detail with respect to embodiments below; however, the present disclosure is not limited at all to the embodiments below and may be carried out with appropriately making a change within the purpose of the present disclosure. In addition, explanation may be occasionally omitted with respect to duplicated matters; this does not however limit the gist of the present disclosure.

The two-component developer of the present disclosure includes a positively chargeable toner and a carrier, and the positively chargeable toner is composed of an external additive and toner base particles containing at least a binder resin, a colorant, a charge control agent and a release agent. The external additive contains at least silica. The silica has an average primary particle diameter (X) of 12 nm or more and 30 nm or less. An average agglomeration ratio (Y2/Y1) of the silica between an average agglomeration number (Y1) of the silica on a surface of the toner base particles and an average agglomeration number (Y2) of the silica on a surface of the carrier is 0.97 or more. And the average agglomeration number (Y2) of the silica on a surface of the carrier is 5 or more and 15 or less. Hereinafter, the positively chargeable toner and the carrier used in the two-component developer and also a method of producing the two-component developer are explained in order.

Positively Chargeable Toner

The toner base particles of the positively chargeable toner used for the two-component developer of the present disclosure contain at least the binder resin, the colorant, the charge control agent, and the release agent. In addition, silica is externally added to the surface of the toner base particles. External additives other than the silica may be added to the toner base particles as required. Hereinafter, the binder resin, the colorant, the charge control agent, and the release agent, which are essential components of the toner base particles used in the present disclosure, a method of producing the toner base particles, silica, external additives other than silica, and external treatment are explained in order.

Binder Resin

The binder resin, which is an main component of the toner base particles, may be used from those used heretofore for binder resins of toners without particular limitation thereto. Specific examples of the binder resin include thermoplastic resins such as styrene resins, acrylic resins, styrene-acrylic resins, polyethylene resins, polypropylene resins, vinyl chloride resins, polyester resins, polyamide resins, polyurethane resins, polyvinyl alcohol resins, vinyl ether resins, N-vinyl resins, and styrene-butadiene resins. Among these resins, styrene-acrylic resins and polyester resins are preferable in view of dispersibility of colorants in the toner, chargeability of the toner, and fixability of the toner to paper. Hereinafter, the styrene-acrylic resin and the polyester resin are explained.

The styrene-acrylic resin is a copolymer of a styrene monomer and an acrylic monomer. Specific examples of the styrene monomer include styrene, α-methylstyrene, vinyl toluene, α-chlorostyrene, o-chlorostyrene, m-chlorostyrene, p-chlorostyrene, and p-ethylstyrene. Specific examples of the acrylic monomer include (meth)acrylic acid alkyl esters such as methyl acrylate, ethyl acrylate, n-propyl acrylate, iso-propyl acrylate, n-butyl acrylate, iso-butyl acrylate, 2-ethylhexyl acrylate, methyl methacrylate, ethyl methacrylate, n-butyl methacrylate, and iso-butyl methacrylate.

The polyester resin may be those resulting from condensation polymerization or condensation copolymerization of an alcohol component and a carboxylic acid component. The components used for synthesizing polyester resins are exemplified by alcohol components and carboxylic acid components below.

In regards to the alcohol component, bivalent, trivalent or higher-valent alcohol components may be used. Specific examples of the bivalent, trivalent or higher-valent alcohols include diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, and polytetramethylene glycol; bisphenols such as bisphenol A, hydrogenated bisphenol A, polyoxyethylenated bisphenol A, and polyoxypropylenated bisphenol A; and trivalent or higher-valent alcohols such as sorbitol, 1,2,3,6-hexane tetrol, 1,4-sorbitane, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

In regards to the carboxylic acid component, bivalent, trivalent or higher-valent carboxylic acid components may be used. Specific examples of the bivalent, trivalent or higher-valent carboxylic acids include bivalent carboxylic acids such as maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, and malonic acid, or alkyl or alkenyl succinic acids including n-butyl succinic acid, n-butenyl succinic acid, isobutylsuccinic acid, isobutenylsuccinic acid, n-octylsuccinic acid, n-octenylsuccinic acid, n-dodecylsuccinic acid, n-dodecenylsuccinic acid, isododecylsuccinic acid, isododecenylsuccinic acid; and trivalent or higher-valent carboxylic acids such as 1,2,4-benzene tricarboxylic acid (trimellitic acid), 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxyl-2-methyl-2-methylene carboxypropane, 1,2,4-cyclohexane tricarboxylic acid, tetra (methylenecarboxyl)methane, 1,2,7,8-octanetetracarboxylic acid, pyromellitic acid, and Enpol trimer. These bivalent, trivalent or higher-valent carboxylic acids may be used as ester-forming derivatives such as an acid halide, an acid anhydride, and a lower alkyl ester. Here, the term "lower alkyl" means an alkyl group of 1 or more and 6 or less carbon atoms.

When the binder resin is a polyester resin, the softening point of the polyester resin is preferably 80° C. and higher and 150° C. or lower and more preferably 90° C. or higher and 140° C. or lower.

A thermoplastic resin is preferably used for the binder resin since fixability to paper of the toner is good; here, the thermoplastic resin may be added with a cross-linking agent or a thermosetting resin rather than solely using the thermoplastic resin. By way of introducing a partial cross-linked structure into the binder resin, properties of the toner such as storage stability, morphological retention, and durability may be improved without degrading fixability to paper of the toner.

Preferable examples of the thermosetting resin usable in combination with the thermoplastic resin are epoxy resins and cyanate resins. Specific examples of the preferred thermosetting resin include bisphenol-A type epoxy resins, hydrogenated bisphenol-A type epoxy resins, novolac-type epoxy resins, polyalkylene ether-type epoxy resins, cyclic aliphatic-type epoxy resins, and cyanate resins. These thermosetting resins may be used in a combination of two or more.

The glass transition point (Tg) of the binder resin is preferably 50° C. or higher and 75° C. or lower and more preferably 55° C. or higher and 65° C. or lower. When the glass transition point is excessively low, the toner itself may agglomerate within development units of image forming apparatuses, or the toner itself may partially agglomerate during shipping of toner containers or storage of the toner containers in warehouses etc. due to degradation of storage stability. Furthermore, the toner is likely to adhere to photoconductor drums etc. due to a lower strength of the binder resin. When the glass transition point is excessively high, fixability of the toner tends to degrade at lower temperatures.

Additionally, the glass transition point of the binder resin can be determined from a changing point of specific heat of the binder resin using a differential scanning calorimeter (DSC). More specifically, it can be determined by measuring an endothermic curve of the binder resin using a differential scanning calorimeter (DSC-6200, by Seiko Instruments Inc.) as a measuring device. Ten mg of a sample to be measured is put into an aluminum pan and an empty aluminum pan is used as a reference. An endothermic curve is measured under the conditions of a measuring temperature range of 25° C. or higher and 200° C. or lower, a temperature-increase rate of 10° C./min, and ambient environment of normal temperature and normal humidity, then the glass transition point can be determined from the resulting endothermic curve.

Colorant

The colorant compounded in the toner base particles may be used from conventional pigments and dyes depending on color of the toner particles. Specific examples of the colorant adaptable to the toner may be exemplified by black pigments such as carbon black, acetylene black, lamp black, and aniline black; yellow pigments such as chrome yellow, zinc yellow, cadmium yellow, yellow iron oxide, mineral fast yellow, nickel titanium yellow, naples yellow, naphthol yellow S, hanza yellow G, hansa yellow 10G, benzidine yellow G, benzidine yellow GR, quinoline yellow lake, permanent yellow NCG, tartrazine lake, and C.I. pigment yellow 180; orange pigments such as red chrome yellow, molybdenum orange, permanent orange GTR, pyrazolone orange, balkan orange, and indanthrene brilliant orange GK; red pigments such as iron oxide red, cadmium red, minium, cadmium mercury sulfate, permanent red 4R, lithol red, pyrazolone red, watching red calcium salt, lake red D, brilliant carmine 6B, eosine lake, rhodamine lake B, alizarin lake, brilliant carmine 3B, and C.I. pigment red 238; violet pigments such as manganese violet, fast violet B, and methyl violet lake; blue pigments such as pigment blue 27, cobalt blue, alkali blue lake, Victoria blue partially chlorinated product, fast sky blue, indanthrene blue BC, and C.I. pigment blue 15:3 (copper phthalocyanine blue pigment); green pigments such as chrome green, chromium oxide, pigment green B, malachite green lake, and final yellow green G; white pigments such as zinc white, titanium dioxide, antimony white, and zinc sulfate; and extender pigments such as barite powder, barium carbonate, clay, silica, white carbon, talc, and alumina white. These colorants may be used in a combination of two or more for the purpose of tailoring the toner to a desired hue etc.

Among these colorants, carbon black is preferable for the colorant of black toner, and C.I. pigment yellow 180 is preferable for the colorant of yellow toner. C.I. pigment blue 15:3 (copper phthalocyanine blue pigment) is preferable for the colorant of cyan toner, and C.I. pigment red 238 is preferable for the colorant of magenta toner.

The content of the colorant in the toner base particles is not particularly limited within a range that does not inhibit the purpose of the present disclosure and may be appropriately decided depending on the type of colorants. The content of the colorant in the toner base particles is preferably 1 part by mass or more and 15 parts by mass or less and more preferably 2 parts by mass or more and 8 parts by mass or less based on 100 parts by mass of the binder resin from the viewpoint that images with desired image densities may be easily formed.

Charge Control Agent

The positively chargeable toner used for the two-component developer of the present disclosure contains a positively-chargeable charge control agent in the binder resin. In the positively chargeable toner, particularly, an inferior charge and its resulting problems of smear in photoconductors, development rollers, etc. are likely to occur due to cracks in silica agglomerates described later.

The type of the positively-chargeable charge control agent, which is not particularly limited within a range that does not inhibit the purpose of the present disclosure, may be appropriately selected from conventional charge control agents used for toners heretofore. Specific examples of the positively-chargeable charge control agent are azine compounds such as pyridazine, pyrimidine, pyrazine, ortho-oxazine, meta-oxazine, para-oxazine, ortho-thiazine, meta-thiazine, para-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline; direct dyes consisting of azine compounds such as azine Fast Red FC, azine Fast Red 12BK, azine Violet BO, azine Brown 3G, azine Light Brown GR, azine Dark Green BH/C, azine Deep Black EW, and azine Deep Black 3RL; nigrosine compounds such as nigrosine, nigrosine salts, and nigrosine derivatives; acid dyes consisting of nigrosine compounds such as nigrosine BK, nigrosine NB, and nigrosine Z; metal salts of naphthenic acid or higher fatty acid; alkoxylated amine; alkylamido; quaternary ammonium salts such as benzylmethylhexyldecyl ammonium, and decyltrimethylammonium chloride; and the like. Among these positively-chargeable charge control agents, nigrosine compounds are particularly preferable since the toner may rapidly maintain a charged amount within a desired range. These positively-chargeable charge control agents may be used in a combination of two or more.

In addition, resins having a quaternary ammonium salt, a carboxylic acid salt, or a carboxyl group as a functional group may be used for the positively-chargeable charge control agent. More specifically, styrene resins having a quaternary ammonium salt, acrylic resins having a quaternary ammonium salt, styrene-acrylic resins having a quaternary ammonium salt, polyester resins having a quaternary ammonium salt, styrene resins having a carboxylic acid salt, acrylic resins having a carboxylic acid salt, styrene-acrylic resins having a carboxylic acid salt, polyester resins having a carboxylic acid salt, styrene resins having a carboxylic group, acrylic resins having a carboxylic group, styrene-acrylic resins having a carboxylic group, and polyester resins having a carboxylic group may be exemplified. Molecular weight of these resins is not particularly limited within a range that does not inhibit the purpose of the present disclosure; and oligomers or polymers may also be allowable.

Among the resins usable as the positively-chargeable charge control agent, styrene-acrylic copolymer resins having a quaternary ammonium salt as the functional group are more preferable since the charged amount may be easily controlled within a desired range. In regards to the styrene-acrylic resins having a quaternary ammonium salt as the functional group, specific examples of acrylic comonomers preferably copolymerized with a styrene unit may be exemplified by (meth)acrylic acid alkyl esters such as methyl acrylate, ethyl acrylate, n-propyl acrylate, iso-propyl acrylate, n-butyl acrylate, iso-butyl acrylate, 2-ethylhexyl acrylate, methyl methacrylate, ethyl methacrylate, n-butyl methacrylate, and iso-butyl methacrylate.

Additionally, the units derived from dialkylamino alkyl (meth)acrylates, dialkyl(meth)acrylamides, or dialkylamino alkyl(meth)acrylamides through a quaternizing step may be used as the quaternary ammonium salt. Specific examples of the dialkylamino alkyl(meth)acrylate include dimethylamino ethyl(meth)acrylate, diethylamino ethyl(meth)acrylate, dipropylamino ethyl(meth)acrylate, and dibutylamino ethyl (meth)acrylate. A specific example of the dialkyl(meth)acrylamide is dimethyl methacrylamide, and a specific example of the dialkylamino alkyl(meth)acrylamide is dimethylamino propylmethacrylamide. Additionally, hydroxyl group-containing polymerizable monomers such as hydroxy ethyl (meth)acrylate, hydroxy propyl(meth)acrylate, 2-hydroxy butyl(meth)acrylate, and N-methylol (meth)acrylamide may be used in combination at the time of polymerization.

Release Agent

The toner used for the two-component developer of the present disclosure contains a release agent. By way of including the release agent in the toner, fixability to paper and offset resistance of the toner can be improved. The type of the release agent compounded into the binder resin is not particularly limited within a range that does not inhibit the purpose of the present disclosure. The release agent is preferably a wax; and examples of the wax include polyethylene wax, polypropylene wax, fluorine resin wax, Fischer-Tropsch wax, paraffin wax, ester wax, Montan wax, and rice wax. These release agents may be used in a combination of two or more. The occurrence of offset or image smearing (smear around images occurring upon rubbing the images) may be effectively inhibited in the resulting images by adding the release agent to the toner.

The amount of the release agent used is not particularly limited within a range that does not inhibit the purpose of the present disclosure. The specific amount of the release agent used is preferably 1 part by mass or more and 20 parts by mass or less and more preferably 2 parts by mass or more and 10 parts by mass or less based on 100 parts by mass of the binder resin. When the amount of the release agent used is excessively small, the desired effect may not be obtained for inhibiting the occurrence of offset or image smearing in the resulting images, and when the amount of the release agent used is excessive large, the storage stability of the toner may be degraded due to the fusion of the toner itself.

Method of Producing Toner Base Particles

The method of producing the toner base particles, used for the two-component developer of the present disclosure, is not particularly limited as long as the components in the toner base particles are uniformly mixed. A specific example of the method of producing the toner base particles may be such that the binder resin and the components including the colorant, the charge control agent, and the release agent are mixed by a mixer, etc., followed by melting and kneading by an extruder etc., then the kneaded material after cooling is pulverized and classified. Typically, average particle diameter of the toner base particles, which is not particularly limited within a range that does not inhibit the purpose of the present disclosure, is preferably 5 μm or more and 10 μm or less.

Silica

The toner, used for the two-component developer of the present disclosure, is attached with an external additive containing silica after preparing the toner base particles having a desired particle diameter by compounding essentially or optionally the binder resin with components such as a colorant, a release agent, and a charge control agent. The type of the silica used in the present disclosure is not particularly limited as long as the average primary particle diameter of the silica is 12 nm or more and 30 nm or less, the average agglomeration ratio (Y2/Y1) of the silica between the average agglomeration number (Y1) of the silica on a surface of the toner base particles and the average agglomeration number (Y2) of the silica on a surface of the carrier is 0.97 or more, and the average agglomeration number (Y2) of the silica on a surface of the carrier is 5 or more and 15 or less. A specific example of preferred silica is fumed silica in which primary silica particles themselves form agglomerates, and particularly preferably is hydrophobic silica in which fumed silica, synthesized by a flame hydrolysis method, is subjected to a pulverizing treatment and then a hydrophobizing treatment.

By performing the pulverizing treatment prior to the hydrophobizing treatment in this way, the agglomerates of primary silica particles can be adjusted in terms of the agglomeration number resistant to cause cracks in silica agglomerates. For this reason, even when the toner receives a strong stress in development devices, occurrence of fog in resulting images may be easily suppressed since decrease of charged amount of the toner may be easily suppressed. Hereinafter, the flame hydrolysis method, the pulverizing treatment, and the hydrophobing treatment are explained in order.

Flame Hydrolysis Method

The method of synthesizing the fumed silica by the flame hydrolysis method is such that a gas of a silicon compound as a raw material like silicon tetrachloride together with an inert gas are introduced into a mixing chamber of a combustion burner and mixed with hydrogen and air to form a mixed gas of a predetermined proportion, the mixed gas is combusted at a temperature of 1000° C. or higher and 3000° C. or lower to synthesize fumed silica, and the synthesized fumed silica is collected by a filter after being cooled.

Pulverizing Treatment

The pulverizing treatment of the resulting fumed silica can be performed by conventional pulverizing machines etc. Specifically, the method for the pulverizing treatment may be such that the silica is mixed with zirconia beads etc. and they are subjected to the pulverizing treatment using powder mixers such as a rocking mixer.

Hydrophobizing Treatment

The hydrophobizing treatment of the silica can be performed by a conventional method to hydrophobize silica. The method for the hydrophobizing treatment of the silica may be such that a hydrophobizing treatment agent such as aminosilane, silicone oil is added dropwise or sprayed to the silica while stirring the silica at a high speed, the silica is added into a solution of an organic solvent of a hydrophobizing treatment agent under stirring, or the like. The silica treated with the hydrophobizing treatment agent is heated, thereby the hydrophobization-treated silica can be obtained. When the hydrophobizing treatment agent is added dropwise or sprayed, the hydrophobizing treatment agent may be used directly or after being diluted with an organic solvent etc.

Specific examples of aminosilane coupling agent may be exemplified by γ-aminopropyl triethoxysilane, γ-aminopropyl methoxysilane, N—(R-aminoethyl)-γ-aminopropyl trimethoxysilane, γ-(2-aminoethyl)-γ-aminopropyl methyldimethoxysilane, and γ-anilinopropyl trimethoxysilane. In order to compensate a hydrophobizing effect, the aminosilane coupling agent may be used together with a hydrophobizing treatment agent other than the aminosilane coupling agent. The hydrophobizing treatment agent other than the aminosilane coupling agent is preferably hexamethyldisilazane from the viewpoint that a hydrophobizing effect and an effect of improving flowability of the toner are excellent.

The type of silicone oil of the hydrophobizing treatment agent is not particularly limited as long as a desired hydrophobizing effect can be obtained, and various silicone oils used heretofore as a hydrophobizing treatment agent may be used. Preferably, the silicone oil has a linear siloxane structure, and non-reactive silicone oils and reactive silicone oils may be used. Specific examples of the silicone oil include, dimethyl silicone oil, phenylmethyl silicone oil, chlorophenyl silicone oil, alkyl silicone oil, chloro silicone oil, polyoxyalkylene denatured silicone oil, fatty acid ester denatured silicone oil, methyl hydrogen silicone oil, silanol group-containing silicone oil, alkoxy group-containing silicone oil, acetoxy group-containing silicone oil, amino denatured silicone oil, carboxylic acid denatured silicone oil, and alcohol denatured silicone oil.

External Additive Other than Silica

In regards to the toner used for the two-component developer of the present disclosure, an external additive other than silica may be attached to a surface of the toner base particles together with the silica in order to improve flowability, storage stability, cleaning ability, etc. of the toner within a range that does not inhibit the purpose of the present disclosure.

The external additive other than silica is not particularly limited within a range that does not inhibit the purpose of the present disclosure and may be appropriately selected from conventional external additives used for toners heretofore. Specific examples of the preferred external additive other than silica may be exemplified by metal oxides such as alumina, titanium oxide, magnesium oxide, zinc oxide, strontium titanate, and barium titanate. These external additives may be used in a combination of two or more.

Average primary particle diameter of the external additive other than silica is not particularly limited within a range that does not inhibit the purpose of the present disclosure; typically, the range of 0.01 μm or more and 1.0 μm or less is preferable.

The value of volume specific resistance of the external additive other than silica may be adjusted by forming a coating layer consisting of tin oxide and antimony oxide on a surface of the external additive and changing a thickness of the coating layer or a ratio of tin oxide to antimony oxide. Furthermore, inorganic fine particles other than silica may be hydrophobization-treated ones similarly to the silica.

External Treatment

The toner may be produced through attaching the silica as the external additive and optionally an external additive other than silica to a surface of the toner base particles. The method of attaching the external additive to a surface of the toner base particles is not particularly limited within a range that does not inhibit the purpose of the present disclosure. In regards to the method of treating the toner base particles with the external additive, preferably, the toner base particles and the external additive are mixed by various mixers while adjusting a treatment condition such that the external additive is not embedded into the toner base particles. Specific examples of the mixer include turbine-type agitator, HENSCHEL MIXER, and super mixer; and HENSCHEL MIXER is more preferable.

Furthermore, the amount of silica used for externally adding on a surface of the toner base particles is preferably 0.5% by mass or more and 4% by mass or less based on the mass of the toner base particles of the present disclosure. Furthermore, when the external additive other than silica is externally added, the amount of the external additive used other than silica is preferably 0.5% by mass or more and 3% by mass or less based on the mass of the toner base particles of the present disclosure.

Carrier

Hereinafter, the carrier used for the two-component developer of the present disclosure is explained. When the two-component developer is prepared, preferably, a magnetic carrier is used as the carrier.

The preferable carrier for making the toner, used for the two-component developer of the present disclosure, into the two-component developer may be exemplified by ones formed of a carrier core coated with a resin. Specific examples of the carrier core include particles of iron, oxidized iron, reduced iron, magnetite, copper, silicon steel, ferrite, nickel, and cobalt; alloy particles of these materials and manganese, zinc, aluminum, etc.; alloy particles of iron-nickel alloy, iron-cobalt alloy, etc.; ceramic particles of titanium oxide, aluminum oxide, copper oxide, magnesium oxide, lead oxide, zirconium oxide, silicon carbide, magnesium titanate, barium titanate, lithium titanate, lead titanate, lead zirconate, lithium niobate, etc.; particles of higher permittivity materials such as ammonium dihydrogen phosphate, potassium dihydrogen phosphate, and Rochelle salts; resin carriers where these magnetic particles have been dispersed into resins; and the like.

Specific examples of the resin, which coats the carrier core, include (meth)acrylic polymer, styrene polymer, styrene-(meth)acrylic copolymer, olefin polymer (polyethylene, chlorinated polyethylene, polypropylene), polyvinyl chloride, polyvinyl acetate, polycarbonate, cellulose resins, polyester resins, unsaturated polyester resins, polyamide resins, polyurethane resins, epoxy resins, silicone resins, fluorocarbon resins (tetrafluoroethylene-hexafluoropropylene copolymer resins, tetrafluoroethylene-perfluoroalkylvinylether copolymer resins, polytetrafluoroethylene, polychlorotrifluoroethylene, polyvinylidene fluoride), phenol resins, xylene resins, diallyl phthalate resins, polyacetal resins, and amino resins (polyamide resins, polyimide resins, polyamideimide resins). These resins may be used in a combination of two or more.

The particle diameter of the carrier, which is not particularly limited within a range that does not inhibit the purpose of the present disclosure, is preferably 20 μm or more and 200 μm or less and more preferably 25 μm or more and 100 μm or less as a particle diameter measured by an electron microscope.

The apparent density of the carrier is not particularly limited within a range that does not inhibit the purpose of the present disclosure. Typically, the apparent density of the carrier, which depends on a carrier composition and a surface structure, is preferably $2.4 \times 10^3$ kg/m$^3$ or more and $3.0 \times 10^3$ kg/m$^3$ or less.

Method of Producing Two-Component Developer

The method of producing the two-component developer is not particularly limited as long as the toner and the carrier can be uniformly mixed; the toner and the carrier may be mixed by a mixing device such as a ball mill. The content of the toner in the two-component developer is preferably 3% by mass or more and 20% by mass or less and more preferably 5% by mass or more and 15% by mass or less based on the mass of the two-component developer. By adjusting the content of the toner in the two-component developer within this range, an appropriate image density may be maintained, and pollution inside image forming apparatuses and adhesion of the toner to transfer paper etc. may be suppressed because of inhibiting scattering of the toner.

When the toner externally added with the silica and the carrier are mixed in this way, typically, a strong image force may act between the silica and the carrier and thus the silica externally added to the toner may migrate to the carrier since positive chargeability of the silica treated to be positively charged is very large. When the silica migrates to the surface of the carrier by mixing the toner and the carrier like this, the silica receives a large stress. By action of such a stress, cracks may occur in the agglomerates of the silica depending on the agglomeration number. Accordingly, in order to prevent the cracks in the agglomerates of the silica, the silica in which the average primary particle diameter and the average agglomeration number are defined as follows is employed as the silica used for the two-component developer of the present disclosure.

In the two-component developer of the present disclosure, the silica externally added to the toner base particles has an average primary particle diameter (X) of 12 nm or more and 30 nm or less. The average agglomeration ratio (Y2/Y1) between the average agglomeration number (Y1) of the silica on a surface of the toner base particles and the average agglomeration number (Y2) of the silica on a surface of the carrier is 0.97 or more. The average agglomeration number (Y2) of the silica on a surface of the carrier is 5 or more and 15 or less. In the two-component developer of the present disclosure which has been mixed under the mixing conditions described above, for example, the average agglomeration number (Y1) of the silica on a surface of the toner base particles, the average agglomeration number (Y2) of the silica on a surface of the carrier, and the average agglomeration ratio (Y2/Y1) of the silica can be measured by the measuring methods below.

Method of Measuring Average Agglomeration Number (Y1) of Silica on Surface of Toner Base Particles A photograph of toner base particles is taken at a magnification of 100,000 times and an acceleration voltage of 0.5 kV using a field emission scanning electron microscope (JSM-7401F, by JEOL Ltd.). The taken photograph of the electron microscope is analyzed by an image analysis software (WIN-ROOF, by Mitani Co.); preferably, the diameter of the primary silica particles and the number of the primary silica particles in agglomerates are measured with respect to 50 or more of silica agglomerates attaching to the surface of the toner base particles. Next, the average primary particle diameter of the silica and the average agglomeration number of the silica are determined using the primary particle diameter of the primary silica particles and the number of the primary silica particles which are contained in the silica agglomerates to be measured.

Method of Measuring Average Agglomeration Number (Y2) of Silica on Surface of Carrier By a method similar to that of the average agglomeration number (Y1) of the silica on a surface of the toner described above, the average agglomeration number (Y2) of the silica on a surface of the carrier can be determined through measuring the number of primary particles that form the silica agglomerates on a surface of the carrier.

In these measurements, when the average primary particle diameter of the silica on a surface of the toner base particles and on a surface of the carrier is 12 nm or more and 30 nm or less, the average agglomeration ratio (Y2/Y1) between the average agglomeration number (Y1) of the silica on a surface of the toner base particles and the average agglomeration number (Y2) of the silica on a surface of the carrier is 0.97 or more, and the average agglomeration number (Y2) of the silica on a surface of the carrier is 5 or more and 15 or less, thereby, embedment of the silica into the toner base particles can be suppressed, and cracks in the silica agglomerates can be suppressed even when the two-component developer receives a strong stress in development devices. For this reason, lowering of image densities of resulting images below a desired value can be suppressed and occurrence of image defects such as fog can be suppressed in the resulting images even in cases of printing for a long period.

In a case in which the average agglomeration ratio (Y2/Y1) of the silica is less than 0.97, when the toner receives a strong stress in development devices, silica agglomerates prone to cracking exist in the two-component developer and the cracked silica agglomerates tend to adhere to the surface of the carrier. Therefore, when the average agglomeration ratio (Y2/Y1) is less than 0.97, charged amount of the toner tends to decrease and image defects such as fog tend to occur in the resulting images.

Furthermore, the average agglomeration number (Y2) of the silica on a surface of the carrier is 5 or more and 15 or less. When the average agglomeration number (Y2) of the silica on a surface of the carrier is less than 5, it becomes difficult to obtain images with desired image densities since there exist many agglomerates where the particle diameter of primary silica particles forming the agglomerates is larger. On the other hand, in a case in which the average agglomeration number (Y2) of the silica on a surface of the carrier is greater than 15, cracks in the silica agglomerates tend to occur when the toner receives a strong stress in development devices; consequently, decrease of charged amount of the toner may not be suppressed and image defects such as fog tend to occur in the resulting images.

Furthermore, when the silica with an average primary particle diameter of less than 12 nm is used, the silica is likely to form agglomerates and the agglomeration number of primary silica particles tends to increase in the silica agglomerates. Consequently, cracks in the silica agglomerates tend to occur, decrease of charged amount of the toner may not be suppressed, and image defects such as fog tend to occur in the resulting images. On the other hand, when the silica with an average primary particle diameter of greater than 30 nm is used, it becomes difficult to obtain images with desired image densities.

In accordance with the two-component developer of the present disclosure described above, lowering of image densities of resulting images below a desired value can be suppressed and occurrence of image defects such as fog can be suppressed in the resulting images even in cases of printing for a long period.

EXAMPLES

The present disclosure is explained more specifically with reference to examples below. In addition, the present disclosure is not limited to the examples.

Preparation of Hydrophobic Silica A 100 g of dimethylpolysiloxane (by Shin-Etsu Chemical Co.) and 100 g of 3-aminopropyl trimethoxysilane (by Shin-Etsu Chemical Co.) were dissolved in 200 g of toluene, then which was diluted to 10 times. Next, the diluted solution of dimethylpolysiloxane and 3-aminopropyl trimethoxysilane was added dropwise little by little into 200 g of fumed silica AEROSIL #90 (by Nippon Aerosil Co.) while stirring the fumed silica. Subsequently, the fumed silica was irradiated with an ultrasonic wave for 30 minutes, and then the fumed silica was stirred and mixed. The resulting mixture was heated in a constant-temperature oven at 150° C., followed by distilling away the toluene in a rotary evaporator to obtain a solid material. The resulting solid material was dried in a vacuum dryer at a preset temperature of 50° C. until weight loss ceased. In addition, the solid material was treated in an electric furnace at 200° C. for 3 hours under nitrogen gas flow to obtain a coarse powder of silica A. The coarse powder of silica A was disintegrated by a jet mill (Model IDS jet mill, by Nippon Pneumatic Mfg. Co.), and the disintegrated material was collected by a bag filter to obtain a hydrophobic silica A.

Preparation of Hydrophobic Silicas E, G, I, and J

Hydrophobic silicas E, G, I, and J were obtained similarly to the hydrophobic silica A except that the used amounts of dimethylpolysiloxane, 3-aminopropyl trimethoxysilane, and toluene were substituted with the used amounts shown in Table 1 and the fumed silica AEROSIL #90 was substituted with the silica shown in Table 1 in relation to the production of the hydrophobic silica A.

Preparation of Hydrophobic Silica B 250 g of fumed silica AEROSIL #90 (by Nippon Aerosil Co.) was introduced into a rocking mixer (RM-10, by Aichi Electric Co.). After filling 5 kg of zirconia beads with a particle diameter of 5 mm into the rocking mixer, the fumed silica was mixed for 1 hour under a condition of 90 rpm, temperature 20° C., and humidity 60% to obtain a pulverized silica. A hydrophobic silica B was obtained similarly to the silica A except that the fumed silica AEROSIL #90 was substituted with the resulting pulverized silica.

Preparation of Hydrophobic Silicas C, D, F, and H

A pulverized silica was obtained similarly to the hydrophobic silica B except that the fumed silica AEROSIL #90 was substituted with the silica shown in Table 1 and mixing period in the rocking mixer was substituted with the period shown in Table 1 in relation to the production of the hydrophobic silica B. Then, hydrophobic silicas C, D, F, and H were obtained similarly to the hydrophobic silica A except that the used amounts of dimethylpolysiloxane, 3-aminopropyl trimethoxysilane, and toluene were substituted with the used amounts shown in Table 1 and the fumed silica AEROSIL #90 was substituted with the pulverized silica shown in Table 1.

TABLE 1

| Silica | Silica in use | Pulverizing Period (hr) | Dimethyl-polysiloxane (g) | 3-aminopropyl-trimethoxy-silane (g) | Toluene (g) |
|---|---|---|---|---|---|
| A | Fumed silica Aerosil #90 (by Nippon Aerosil Co.) | — | 100 | 100 | 200 |
| B | Fumed silica Aerosil #90 (by Nippon Aerosil Co.) | 1 | 100 | 100 | 200 |
| C | Fumed silica Aerosil #90 (by Nippon Aerosil Co.) | 2 | 100 | 100 | 200 |
| D | Fumed silica Aerosil #90 (by Nippon Aerosil Co.) | 4 | 100 | 100 | 200 |
| E | Fumed silica Aerosil #200 (by Nippon Aerosil Co.) | — | 200 | 200 | 200 |
| F | Fumed silica Aerosil #200 (by Nippon Aerosil Co.) | 1 | 100 | 100 | 200 |
| G | Fumed silica Aerosil #50 (by Nippon Aerosil Co.) | — | 80 | 80 | 200 |
| H | Fumed silica Aerosil #50 (by Nippon Aerosil Co.) | 1 | 100 | 100 | 200 |
| I | Fumed silica Aerosil Ox50 (by Nippon Aerosil Co.) | — | 50 | 50 | 200 |
| J | Fumed silica Aerosil #300 (by Nippon Aerosil Co.) | — | 300 | 300 | 500 |

Preparation of Toner Base Particles 100 parts by mass of a binder resin (styrene-acrylic resin, glass transition point 62° C., softening point 132° C., by Sekisui Chemical Co.), 4 parts by mass of a release agent (No. 1 carnauba wax, by S. Kato & Co.), 12 parts by mass of a colorant (carbon black, MA-100, by Evonik Degussa Co.), and 1 part by mass of a charge control agent (P-51, by Orient Chemical Industries Co.) were poured and mixed in a HENSCHEL MIXER, and the resulting mixture was melted and kneaded by a twin screw extruder. The kneaded material was cooled and then coarsely pulverized by a hammer mill. The coarsely pulverized material was finely pulverized by a turbo mill. The finely pulverized material was classified by a wind classifier to obtain toner base particles with a volume average particle diameter of 6.47 µm.

Preparation of Carrier 30 g of a polyamideimide resin was diluted with 2 L of water to obtain a diluted solution. 120 g of tetrafluoroethylene-hexafluoropropylene copolymer (FEP) was dispersed in the resulting diluted solution and then 3 g of silicon oxide was also dispersed to obtain a coating layer forming liquid. The coating layer forming liquid and 10 kg of non-coat ferrite carrier EF-35B (by Powder-Tech Co., average particle diameter 35 µm) were poured into a fluidized bed coater to coat the non-coat ferrite carrier. Subsequently, baking was carried out at 250° C. for 1 hour to obtain a carrier coated with the FEP.

Example 1

Toner base particles and hydrophobic silica C of 2% by mass based on a total amount of toner were added to a HENSCHEL MIXER (FM-20B, by Mitsui Miike Machinery Co.). Then, the toner base particles and the hydrophobic silica C were mixed by the HENSCHEL MIXER at a speed of 40 m/sec for 5 minutes to obtain a toner. The resulting toner of 30 g and 300 g of the carrier were mixed by a ball mill (universal ball mill UB32, by Yamato Scientific Co.) at a speed of 75 rpm for 30 minutes to prepare a two-component developer. A loose apparent specific gravity of the silica was measured in accordance with the method below. The resulting measurement results are shown in Table 2.

Method of Measuring Loose Apparent Specific Gravity

A sample was slowly filled into a stainless container of 100 mL. The filling was stopped at the time when the sample had just overflowed. An excessive sample at an upper end of the container was cut off while sliding a scraper. Then, the mass (g) of the sample in the container was measured. The measured mass (g) of the sample was divided by the volume (0.1 L) of the container to obtain a loose apparent specific gravity (g/L).

Furthermore, the resulting two-component developer was measured for an average primary particle diameter of the silica, an average agglomeration number (Y1) of the silica on a surface of toner base particles, and an average agglomeration number (Y2) of the silica on a surface of the carrier in accordance with the method below. An average agglomeration ratio (Y2/Y1) of the silica was determined from the measured agglomeration number (Y1) of the silica on a surface of toner base particles and the agglomeration number (Y2) of the silica on a surface of the carrier. The resulting measured results are shown in Table 2.

Method of Measuring Average Agglomeration Number (Y1) of Silica on Surface of Toner Base Particles A photograph of toner base particles was taken at a magnification of 100,000 times and an acceleration voltage of 0.5 kV using a field emission scanning electron microscope (JSM-7401F, by JEOL Ltd.). The taken photograph of the electron microscope was analyzed by an image analysis software (WINROOF, by Mitani Co.); and a primary particle diameter and a number of primary particles, forming each agglomerate, were measured with respect to 50 silica agglomerates attaching to the surface of the toner base particles. Next, an average primary particle diameter and an average agglomeration number (Y1) were measured using the primary particle diameter of primary particles forming silica agglomerates and the number of primary particles contained in 50 silica agglomerates.

Method of Measuring Agglomeration Number (Y2) of Silica on Surface of Carrier

A number of primary particles, forming each silica agglomerate, on a surface of the carrier was measured by a method similar to that of the average agglomeration number (Y1) of the silica on a surface of toner described above, and an average agglomeration number (Y2) was determined.

The resulting two-component developer was evaluated for image density and fog using a multifunctional peripheral (TASKalfa 500ci, by Kyocera Mita Co.) as an evaluation device in accordance with the methods below. The evaluation results of image density and fog are shown in Table 3.

Method of Evaluating Image Density

Using the resulting two-component developer, a 300,000-sheet continuous printing test of a black-and-white image with a coverage rate of 5.0% was performed under a normal environment (20° C. to 23° C., 50% to 65% of humidity) using the multifunctional peripheral. After the 300,000-sheet printing, a sample image for image evaluation was output, and image density was measured at a solid portion in the sample image by an image density meter (Spectroeye, by GretagMacbeth Co.). An image density of 1.20 or more was determined to be OK, and that of less than 1.20 was determined to be NG.

Method of Evaluating Fog Density

Using the resulting two-component developer, a 3000-sheet continuous printing test of a black-and-white image with a coverage rate of 0.2% was performed under a normal environment (20° C. to 23° C., 50% to 65% of humidity) using the multifunctional peripheral. After the 3000-sheet continuous printing, a sample image with a coverage rate of 50% for image evaluation was output, and a value of image density at a maximum fog was measured. The value of image density of the fog was measured by the image density meter (Spectroeye, by GretagMacbeth Co.). A value of image density at fog of 0.01 or less was determined to be OK, and that of greater than 0.01 was determined to be NG.

Examples 2 to 4 and Comparative Examples 1 to 6

Two-component developers of Examples 2 to 4 and Comparative Examples 1 to 6 were obtained similarly to Example 1 except that the type and the additive amount of hydrophobic silica used were substituted with the type and the additive amount described in Table 2. The two-component developers of Examples 2 to 4 and Comparative Examples 1 to 6 were measured for a loose apparent specific gravity of the silica, an average primary particle diameter of the silica, an average agglomeration number (Y1) of the silica on a surface of the toner, an average agglomeration number (Y2) of the silica on a surface of the carrier, and an average agglomeration ratio (Y2/Y1) of the silica similarly to Example 1. The measurement results are shown in Table 2. The two-component developers of Examples 2 to 4 and Comparative Examples 1 to 6 were also measured for image density and fog. The measurement results of the image density and the fog of Examples 2 to 4 and Comparative Examples 1 to 6 are shown in Table 3.

Comparative Example 7

A two-component developer of Comparative Example 7 was obtained similarly to Example 1 except that the hydrophobic silica C as an external additive was substituted with colloidal silica (TG-C425, by Cabot Japan Co.) in a used amount of 5% by mass based on total amount of the toner. The two-component developer of Comparative Example 7 was measured for a loose apparent specific gravity of the silica, an average primary particle diameter of the silica, an average agglomeration number (Y1) of the silica on a surface of the toner base particles, an average agglomeration number (Y2) of the silica on a surface of the carrier, and an average agglomeration ratio (Y2/Y1) of the silica similarly to Example 1. The measurement results are shown in Table 2. The two-component developer of Comparative Example 7 was also evaluated for image density and fog similarly to Example 1. The measurement results of the image density and the fog of Comparative Example 7 are shown in Table 3.

TABLE 2

| | Silica | | | | | | |
|---|---|---|---|---|---|---|---|
| | | | | Average agglomeration number | | | |
| | | Additive amount (% by mass) | Average Primary Particle Diameter X (nm) | Toner surface Y1 (number) | Carrier surface Y2 (number) | Y2/Y1 | Apparent specific gravity (g/L) |
| | Type | | | | | | |
| Example 1 | C | 2 | 20 | 7.2 | 7.2 | 1.000 | 220 |
| Example 2 | B | 2 | 20 | 12.2 | 12.0 | 0.984 | 200 |
| Example 3 | F | 1.2 | 12 | 13.1 | 12.8 | 0.977 | 210 |
| Example 4 | H | 3 | 30 | 6.3 | 6.4 | 1.016 | 250 |
| Comparative Example 1 | D | 2 | 20 | 3.8 | 3.9 | 1.026 | 280 |
| Comparative Example 2 | A | 2 | 20 | 18.9 | 13.4 | 0.709 | 30 |
| Comparative Example 3 | E | 1.2 | 12 | 22.7 | 15.8 | 0.696 | 35 |
| Comparative Example 4 | G | 3 | 30 | 15.1 | 12.2 | 0.808 | 30 |
| Comparative Example 5 | I | 4 | 40 | 5.2 | 4.9 | 0.942 | 50 |
| Comparative Example 6 | J | 0.7 | 7 | 29.7 | 17.9 | 0.603 | 35 |
| Comparative Example 7 | Colloidal silica | 5 | 50 | 1.6 | 1.7 | 1.063 | 420 |

TABLE 3

| | Toner | Image density | Fog |
|---|---|---|---|
| Example 1 | A | 1.24/OK | OK |
| Example 2 | B | 1.27/OK | OK |
| Example 3 | C | 1.44/OK | OK |
| Example 4 | D | 1.26/OK | OK |
| Comparative | E | 1.11/NG | OK |

TABLE 3-continued

| | Toner | Image density | Fog |
|---|---|---|---|
| Example 1 | | | |
| Comparative Example 2 | F | 1.30/OK | NG |
| Comparative Example 3 | G | 1.32/OK | NG |
| Comparative Example 4 | H | 1.28/OK | NG |
| Comparative Example 5 | I | 1.16/NG | NG |
| Comparative Example 6 | J | 1.41/OK | NG |
| Comparative Example 7 | K | 1.04/NG | OK |

In the two-component developers of Examples 1 to 4, where every silica thereof has an average primary particle diameter (X) of 12 nm or more and 30 nm or less, an average agglomeration ratio (Y2/Y1) of 0.97 or more between an average agglomeration number (Y1) on a surface of the toner base particles and an average agglomeration number (Y2) on a surface of the carrier, and an average agglomeration number (Y2) of 5 or more and 15 or less on a surface of the carrier, as a whole, lowering of image densities of resulting images below a desired value can be suppressed and occurrence of fog can be suppressed even in cases of printing for a long period.

In the two-component developer of Comparative Example 1, where the average agglomeration number (Y2) of the silica on a surface of the carrier is less than 5 and the diameter of primary silica particles is 12 nm or more and 30 nm or less, agglomerates tend to be embedded into the surface of the toner. For this reason, when images are formed using the two-component developer of Comparative Example 1, image densities of the resulting images is likely to be lower than a desired value. Furthermore, silica with an average primary particle diameter of greater than 30 nm is used in the two-component developers of Comparative Examples 5 and 7, thus agglomerates are unlikely to be embedded into the surface of the toner even if the agglomeration number is small, however, image densities of the resulting images is likely to be lower than a desired value due to a large particle diameter of primary silica particles.

It is understood from Comparative Examples 2 to 6 that when the silica has an average agglomeration ratio (Y2/Y1) of less than 0.97 between an average agglomeration number (Y1) on a surface of the toner base particles and an average agglomeration number (Y2) on a surface of the carrier, cracks tend to occur in the silica agglomerates and thus charged amount of the toner tends to decrease, therefore fog tends to occur in the resulting images. Furthermore, silica with an average primary particle diameter of less than 12 nm is used in the two-component developer of Comparative Example 6, thus the silica tends to form agglomerates and the number of agglomerates of primary particles tends to increase. As a result, in the two-component developer of Comparative Example 6, the external diameter of agglomerates becomes larger and thus cracks tend to occur in the silica agglomerates.

What is claimed is:

1. A two-component developer, comprising a positively chargeable toner and a carrier,
wherein the positively chargeable toner is composed of an external additive and toner base particles containing at least a binder resin, a colorant, a charge control agent and a release agent,
the external additive externally added to the toner base particles contains at least hydrophobic silica which is synthesized by a flame hydrolysis method, followed by pulverizing and then hydrophobizing,
the silica has an average primary particle diameter (X) of 12 nm or more and 30 nm or less, an average agglomeration ratio (Y2/Y1) between an average number of silica primary particles forming silica secondary particles (Y1) on a surface of the toner base particles and an average number of silica primary particles forming silica secondary particles (Y2) on a surface of the carrier is 0.97 or more, and the average number of silica primary particles forming silica secondary particles (Y2) on a surface of the carrier is 5 or more and 15 or less.

2. The two-component developer according to claim 1, wherein the silica externally added to the toner base particles has a loose apparent specific gravity of 200 g/L or more and 250 g/L or less.

* * * * *